INVENTOR
ANTON THEER

United States Patent Office 3,674,349
Patented July 4, 1972

3,674,349
MOTION PICTURE CAMERA WITH AUTOMATI-CALLY DEACTIVATABLE FADING MEANS
Anton Theer, Munich, Germany, assignor to Agfa-Gevaert Aktiengesellschaft, Leverkusen, Germany
Filed Apr. 26, 1971, Ser. No. 137,410
Claims priority, application Germany, Apr. 24, 1970,
P 20 19 918.2
Int. Cl. G03b *21/36*
U.S. Cl. 352—91
12 Claims

ABSTRACT OF THE DISCLOSURE

A motion picture camera for use with takeup reels which can be rotated only in a direction to collect the film has a fading mechanism which can temporarily arrest the takeup reel during the making of exposures with fade-out effect so that the length of film which was exposed with such effect is stored in the cassette close to the takeup reel in the form of one or more loose loops. The frame counter is provided or cooperates with a blocking device which deactivates the fading mechanism when the position of the frame counter indicates that the major part of motion picture film is already collected by the takeup reel so that the space around the takeup reel cannot properly store that length of film which is to be exposed with fade-out effect. The blocking device can open a switch in the fading mechanism or can disengage an arresting member of the fading mechanism from the takeup reel so that the latter is free to rotate in a direction to collect the film.

BACKGROUND OF THE INVENTION

The present invention relates to photographic apparatus in general, and more particularly to improvements in motion picture cameras of the type having fading means serving to enable the user to make exposures with fade-out and/or fade-in effect. Still more particularly, the invention relates to improvements in motion picture cameras with automatic or semiautomatic fading means, with a frame counter, and with a takeup reel which can rotate in a single direction, namely, in a direction to collect the exposed motion picture film.

It is well known that the magazines or cassettes for Super-8 film employ takeup reels which are rotatable in a single direction, namely, in a direction to collect exposed film frames. Until recently, such cameras were not provided with fading means because, if the exposures which were made with fade-out effect are to be repeated with fade-in effect, those frames which were exposed with fade-out effect must be transported rearwardly past the film gate. Such rearward transport is not possible if the takeup reel which is rotatable in a single direction is allowed to collect all frames which were already exposed with fade-out effect. Certain recent types of motion picture cameras are provided with mechanisms which can temporarily arrest the takeup reel while the customary claw pull-down continues to transport the film forwardly during the making of exposures with fade-out effect so that the thus exposed frames are not collected by the takeup reel. The pull-down is thereupon caused to transport the once-exposed film frames rearwardly, and the direction of operation of the pull-down is then changed again simultaneously with unlocking of the takeup reel so that the film frames which were exposed with fade-out effect can be exposed again but with fade-in effect and the twice exposed frames are automatically collected by the core of the takeup reel. The present invention relates to motion picture cameras which are designed to utilize such takeup reels and such types of fading means.

A drawback of presently known motion picture cameras with fading means and with takeup reels which can rotate in a single direction is that, if the fading operation is started at a time when the major part of motion picture film is already collected by the takeup reel, the space around or close to the takeup reel (downstream of the customary film gate which registers with the optical system of the camera) is insufficient to properly accommodate that length of film which is to be exposed with fade-out effect while the takeup reel is held against rotation. As a rule, the takeup reel is stored in a cassette or magazine and the film which is convoluted on the core of the takeup reel occupies the major part of the space around the takeup reel when the major part of motion picture film is already paid out by the supply reel. Therefore, if the operator of the motion picture camera decides to make exposures with fade-out effect shortly before the entire film is collected by the takeup real, the film portion which is being exposed with fade-out effect and is being stored in the cassette close to the takeup reel is likely to be scratched, creased, folded or otherwise damaged.

SUMMARY OF THE INVENTION

An object of the invention is to provide a motion picture camera of the type wherein the takeup reel is rotatable in a single direction with fading means which enables the operator to make exposures with fade-out and fade-in effect but only at such times when the film which is to be exposed with fade-out effect can be readily stored in unconvoluted conditions without scratching, creasing, folding or other damage.

Another object of the invention is to provide the just outlined motion picture camera with a blocking arrangement which automatically determines whether or not the camera can make exposures with fade-out or fade-in effect without any damage to the motion picture film.

A further object of the invention is to provide a blocking arrangement which can be installed in presently known cameras with fading means without necessitating substantial alterations in the design and/or mode of operation of such cameras.

An additional object of the invention is to provide a blocking arrangement which is operated by or otherwise associated with the film frame counter of a motion picture camera to insure that the making of exposures with fade-out and fade-in effect is prevented only at a time when the making of such exposures could result in damage to motion picture film.

The invention is embodied in a motion picture camera which comprises preferably reversible film transporting means which is operable to transport motion picture film lengthwise (forwardly or rearwardly), rotary takeup means which is preferably mounted in a cassette for motion picture film and normally receives motion from the transporting means to collect the film while the film is being transported forwardly, frame counter means operatively connected with the transporting means and movable thereby between a plurality of positions each of which is indicative of a different number of unexposed film frames, automatic or semiautomatic fading means which is activatable or operable to arrest the takeup means while the transporting means is in operation so as to prevent collection of a length of forwardly transported film by the takeup means (namely, to prevent collection of that length of film which was exposed with fade-out effect), and blocking means provided at least in part on or otherwise cooperating with the frame counter means to deactivate the fading means in at least one predetermined position of the frame counter means. The arrangement is preferably such that the blocking means deactivates or prevents the operation of the fading means in that position or in those positions of the frame counter means which are indicative of a predetermined minimum number of unexposed film frames, namely, of such number which is not sufficient to make a requisite number of exposures with fade-out and fade-in effect or of such number which is indicative that the major part of motion picture film is already convoluted on the takeup means so that the space around on close to the takeup means cannot properly accommodate that length of film which is to be exposed with fade-out effect.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
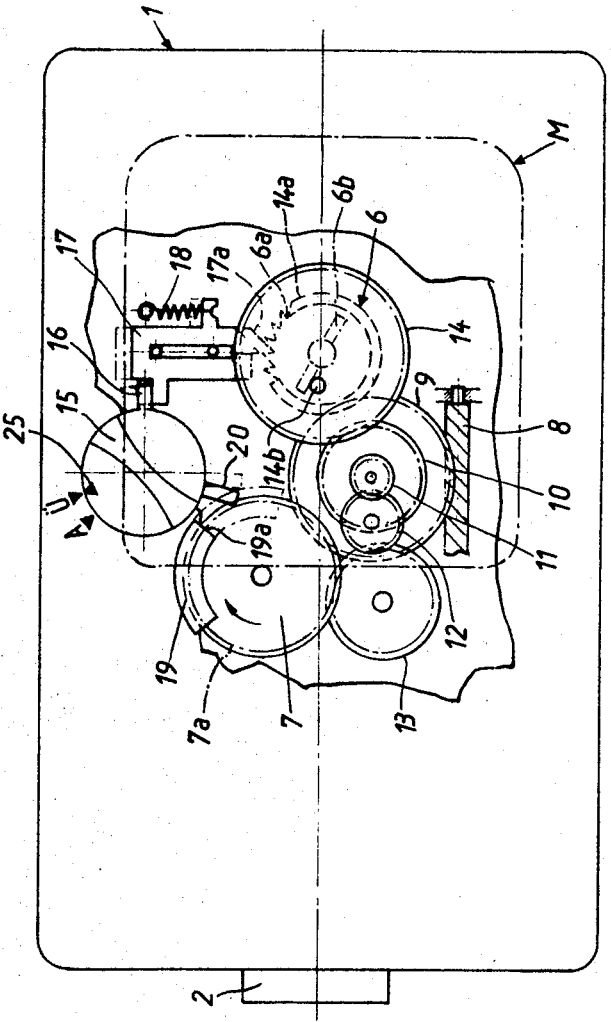
FIG. 1 is a schematic side elevational view of a motion picture camera with a portion of one side wall of the housing broken away to illustrate a blocking mechanism for fading means which embodies one form of the invention.

Referring first to FIG. 1, there is shown a motion picture camera for use with 8-millimeter film. The camera comprises a housing or body 1 the front wall of which carries a mount 2 for the picture taking lens. The interior of the housing 1 accommodates a reversible electric motor 3 (FIG. 2) which forms part of the film transporting means and is connectable with one or more batteries or another suitable energy source 4 by means of a master switch 5 which is actuatable by the camera release, not shown. The output shaft of the motor 3 can drive a power train of the film-transporting means here shown as a gear train which can rotate a takeup reel 6 by way of an eccentric pin 14b engaging a motion-receiving rib 6b of the takeup reel 6. The pin 14b can be caused to orbit about the axis of a gear 14 by means of a friction clutch 14a which is indicated by a broken-line circle. The gear 14 forms part of the aforementioned gear train which further includes a worm 8 driven by the motor 3, a worm wheel 9 which meshes with the worm 8, and a gear 10 which is coaxial with and secured to the worm wheel 9 and meshes with the gear 14. Thus, when the motor 3 is caused to rotate its output shaft in a first direction, the gear train 8, 9, 10, 14 drives the pin 14b by way of the clutch 14a to rotate the takeup reel 6 in a direction to collect the motion picture film, not shown.

The output shaft of the motor 3 further drives a frame counter here shown as a disk or wheel 7 which is arranged to complete one revolution in response to exposure of the entire motion picture film. Each of a plurality of angular positions of the disk 7 corresponds to and is indicative of a different number of exposed or unexposed film frames. The disk 7 is provided with suitable indicia, not shown, which can be observed in a window provided in the housing 1 or directly in the view finder of the motion picture camera. The transmission which rotates the disk 7 in response to rotation of the output shaft of the motor 3 in a direction to advance the film forwardly includes a pinon 11 which is coaxial with and is affixed to the gear 10, a second pinion 12 which meshes with the pinion 11, a gear 13 which meshes with the pinion 12, and a gear 7a which is provided on or secured to the disk 7.

The motor 3 further drives the customary claw pull-down (not shown) and the shutter which shields the film from incoming light during transport of the film between successive exposures. The pull-down moves the film stepwise to place successive frames into registry with the film gate, not shown.

The fading mechanism of the camera comprises a manually or automatically turnable actuating member or knob 15 which can be moved between the illustrated operative position and a second or inoperative position. In the operative position, a pointer or index 25 of the knob 15 registers with a stationary symbol "U" on the housing 1 or on a scale which is applied to the housing. In the inoperative position of the knob 15, the index 25 registers with a second symbol "A."

When the knob 15 is moved to the illustrated operative position, its radially outwardly projecting arm 16 causes a spring-biased arresting member or latch 17 of the fading mechanism to move its pallet or tooth 17a into engagement with a ratchet wheel 6a on the takeup reel 6 so that the latter is held against rotation in response to rotation of the gear 14. The friction clutch 14A then allows the eccentric pin 14b to remain at a standstill while the gear 14 continues to rotate as the motor 3 drives its output shaft in a direction to advance the film forwardly. The transport of the film continues because the aforementioned pull-down is in operation and advances the film stepwise past the film gate so that the film frames which are exposed during fade-out form one or more loose loops which accumulate in the region of the takeup reel 6 but are not convoluted thereon. The arresting member or latch 17 is biased to its retracted position by a helical spring 18 which insures that the take-up reel 6 is free to rotate forwardly as soon as the index 25 is moved into registry with the symbol "A."

In accordance with a feature of the invention, the camera is further provided with blocking means which insures that the film frames cannot be exposed with fade-out effect when the major part of motion picture film is already convoluted on the takeup reel 6, i.e., when the space around the core of the takeup reel is not sufficient to collect loose loops of film without scratching, creasing, folding or otherwise undesirably affecting that length of film which is normally exposed with fade-out effect prior to transport of the thus exposed length of film in a rearward direction to be thereupon exposed again but with fade-in effect. As a rule, the film and the takeup reel 6 are installed in a cassette or magazine M which can be inserted into the housing 1 and the space around the reel 6 is normally sufficient to collect that length of film which is to be exposed with fade-out effect only if the supply reel (not shown) still contains a reasonable supply of unexposed film. The aforementioned blocking means is designed to automatically effect a return movement of the arresting member or latch 17 to its retracted position (even if the knob 15 has been moved to the operative position) when the major part of (exposed) film is already collected by the takeup reel 6.

The improved blocking means is shown as being provided in part on the frame counter disk 7 and in part on the knob 15. The portion on the disk 7 comprises an arcuate sector 19 having a radially or substantially radially extending front surface or shoulder 19a, and the portion on the knob 15 comprises a radially extending arm or projection 20. The projection 20 extends into the path of movement of the shoulder 19a and causes the knob 15 to leave the illustrated operative position and to move toward the inoperative position when the disk 7 moves beyond a predetermined position which is indicative of the fact that the major part of motion picture film is already collected by the takeup reel 6 and that the space around the reel 6 in the magazine M is not sufficient to accommodate that length of film which is to be exposed with fade-out effect. The disk 7 is assumed to rotate in a clockwise direction, as viewed in FIG. 1 and, when the shoulder 19a reaches the projection 20 while the knob 15 dwells in the illustrated operative position, the fading mechanism is automatically deactivated in response to continued rotation of the output shaft of the motor 3 in a direction to advance the film forwardly because the shoulder 19a then pivots the knob 15 in a counterclockwise direction, as viewed in FIG. 1, whereby the arm 16 enables the spring 18 to retract the tooth 17a from engagement with the adjacent teeth of the ratchet wheel 6a. Thus, the takeup reel 6 continues to rotate in response to rotation of the gear 14 and collects the film in the customary way. The film is then exposed without fade-out effect because the knob 15 dwells in the inoperative position, and the knob 15 is compelled to remain in such inoperative position (in which the index 25 registers with the symbol "A") because the projection 20 is engaged by the sector 19 and the latter slides along the projection 20 while the disk 7 turns in response to rotation of the worm wheel 9 in a direction which is needed to cause the takeup reel 6 to collect the film.

When the takeup reel 6 has collected a relatively small quantity of exposed film, i.e., when the sector 19 is distant from the projection 20 of the actuating member or knob 15, the operator can move the knob 15 to the illustrated operative position to thereby arrest the takeup reel 6 by causing the tooth 17a of the arresting member or latch 17 to engage the ratchet wheel 62. The fading mechanism is then activated and causes the shutter or the diaphragm to gradually reduce the amount of incident light so that a predetermined number of film frames is then exposed with fade-out effect. The fading mechanism is preferably automatic so that it causes the motor 3 to change the direction of its rotation as soon as the exposures with fade-out effect are completed. The pull-down then moves the frames which were exposed with fade-out effect backwards, namely, to a position upstream of the film gate, and the motor 3 is thereupon caused to again drive the worm 8 in a forward direction while the knob 15 returns to the inoperative position so that the frames which were exposed with fade-out effect are exposed again but with fade-in effect. When the exposures with fade-in effect are completed, the motor 3 continues to drive the takeup reel 6 in a forward direction and the next-following exposures are made in the normal way, i.e., without a fade-out or fade-in effect. The exact construction of the entire fading mechanism forms no part of the present invention. FIG. 1 merely shows those parts of the fading mechanism which are directly affected by movement of the frame counter disk 7 to a predetermined position in which the shoulder 19a of the arcuate sector 19 begins to pivot the knob 15 by way of the projection 20 to effect a disengagement of the tooth 17a from the ratchet wheel 6a on the takeup reel 6.

It is well known that cassettes M for Super-8 motion picture film contain takeup reels 6 which can rotate in a single direction, namely, in a direction to collect the film. The provision of the aforementioned clutch 14a insures that such cassettes can be used to produce fade-out and fade-in effects by permitting the takeup reel 6 to remain at a standstill during the making of exposures with fade-out effect and during the rearward transport of film by the pull-down so as to return the frames which were exposed with fade-out effect to a position upstream of the film gate in order to insure that such frames can be exposed again but with fade-in effect. As a rule, the number of frames which are to be exposed with fade-in and fade-out effect is not very high; nevertheless, that length of film which is to be exposed with fade-out effect prior to rearward transport of such film length occupies sufficient space in the cassette M for Super-8 film that the looped film is likely to be damaged if it were to be introduced into the space around the takeup reel 6 at a time when the takeup reel has already collected the major part of film. The improved blocking mechanism prevents the camera from making exposures with fade-out effect (i.e., from arresting the takeup reel 6) when the takeup reel has collected the major part of film and the space around or close to the takeup reel (downstream of the film gate) is not sufficient to allow for storage of looped film without the likelihood of deformation, creasing, scratching and/or other damage. The same holds true when the film is not stored in a cassette, i.e., when the film which is exposed with fade-out effect is simply accumulated in the interior of the camera housing rather than in the interior of a cassette.

The retracted position of the latch 17 is indicated in FIG. 1 by phantom lines. It is clear that the sector 19, or another blocking part which is mounted on or rotates or otherwise moves in response to movement of the frame counter disk 7, can turn the activating knob 15 by way of the latch 17 which is returned to the retracted position in response to rotation of the disk 7 at a time when the major part of film is already collected by the takeup reel 6. Thus, the blocking means can act on the knob 15 indirectly, for example, by way of the latch 17 or by way of another movable part which is displaceable by the disk 7 or by the transmission which drives the disk 7 in response to operation of the motor 3 in a direction to advance the film forwardly. As a rule, the position of the shoulder 19a on the sector 19 of the disk 7 will be selected in such a way that the takeup reel 6 is not permitted to come to a standstill when the film is almost completely convoluted on the core of the takeup reel, for example, when the remaining length of unexposed film is insufficient to make a requisite number of exposures with fade-out effect. The manner in which the frame counter disk 7 is automatically reset to zero position when the magazine M with exposed film therein is removed from the housing 1 forms no part of the present invention.

Figure 2:
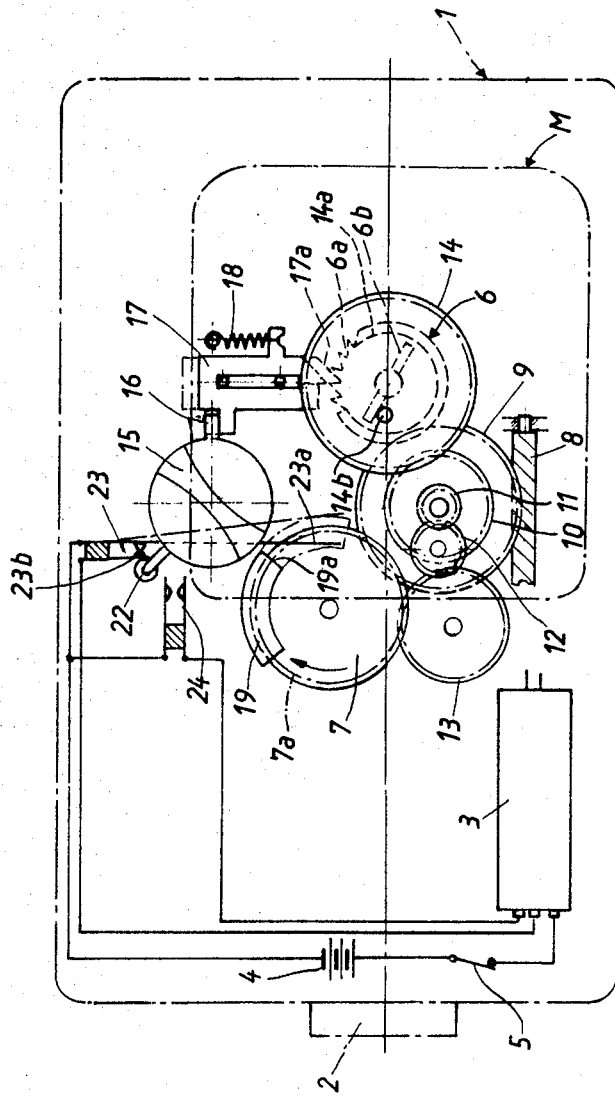
FIG. 2 is a similar schematic side elevational view of a second motion picture camera embodying a modified blocking mechanism for the fading means.

FIG. 2 illustrates a modified motion picture camera. All such parts of the modified camera which are identical with or clearly analogous to the corresponding parts of the camera shown in FIG. 1 are denoted by similar reference characters.

The blocking means which prevents stoppage of the takeup reel 6 when the latter has collected the major part of motion picture film again comprises an arcuate sector 19 on the frame counter disk 7 and an extension 23a which forms part of one contact of an electric switch 23 which has a second contact 23b. The contact 23a must engage the contact 23b when the motor 3 is to operate in a direction to advance the film forwardly during fade-out. The knob 15 of the fading mechanism has a roller-shaped actuating element or trip 22 which closes the switch 23 (by moving the contact 23b against the contact 23a) when the knob 15 assumes the illustrated operative position in which the spring 18 is free to maintain the tooth 17a of the latch 17 in engagement with the ratchet wheel 6a on the takeup reel 6. The extension of the contact 23a extends into the path of movement of the front surface or shoulder 19a on the sector 19 and the switch 23 opens automatically, irrespective of the position of the knob 15, when the angular position of the disk 7 is indicative of the fact that the major part of motion picture film is already collected by the core of the takeup reel 6, i.e., that the space around the reel 6 in the magazine or cassette M is insufficient to permit accumulation of loose loops of film which are formed during the making of exposures with fade-out effect (namely, when the pull-down of the film transporting mechanism advances the film stepwise while the reel 6 is held against rotation by the tooth 17a of the latch 17).

When the switch 23 is closed by the trip 22 of the knob 15, the motor 3 is set to rotate its output shaft in a forward direction so that the pull-down advances the film stepwise in a direction from the supply reel (not shown) toward the takeup reel 6. The reel 6 rotates and collects the film when the trip 22 is disengaged from the switch 23, namely, when the arm 16 permits the spring 18 to maintain the latch 17 in the retracted position which is indicated by phantom lines.

When the camera can make exposures with fade-out and fade-in effect, namely, when the space around the takeup reel 6 in the cassette M is sufficient to properly accommodate that length of film which was exposed with fade-out effect, the fading means is activated by moving the knob 15 to the position which is shown in FIG. 2. The camera then exposes a predetermined number of frames with fade-out effect, the direction of rotation of the output shaft of the motor 3 is thereupon automatically reversed by causing the trip 22 of the knob 15 to close a second switch 24 which is also installed in the circuit of the motor 3 so that the pull-down transports rearwardly those film frames which were exposed with fade-out effect. The trip 22 is thereupon caused to move to a neutral position and the direction of operation of the motor 3 is changed again so that the film frames which were exposed with fade-out effect are exposed again but with fade-in effect. The fade-in effect is terminated when all of the frames which were exposed with fade-out effect are exposed for the second time and, from there on, the cemera makes exposures in the normal way.

If the major part of film is already collected by the takeup reel 6 when the operator of the camera decides to make exposures with fade-out effect, the shoulder 19a of the sector 19 prevents closing of the switch 23 by engaging the extension of the contact 23a so that the switch 23 remains in open position and the motor 3 cannot be driven in a direction to move the film forwardly. The motor 3 is arrested because the switch 23 is open and the operator knows that the knob 15 must be turned to leave the operative position. Those positions of the sector 19 in which the disk 7 prevents the making of exposures with fade-out effect are indicated in FIGS. 1 and 2 by phantom lines.

The improved camera is susceptible of many additional modifications. For example, the parts 17, 6a for arresting the takeup reel 6 for the purpose of making exposures with fade-out effect can be replaced with other types of arresting means. Also, and as mentioned above in connection with FIG. 1, the blocking means need not include parts which are mounted directly on the frame counter disk 7; such parts can be rotated or otherwise moved by the disk 7 or by the transmission which drives the disk 7. The gear train which drives the pin 14b and/or the transmission which rotates the disk 7 can be replaced with a linkage, and the means for moving a blocking member which replaces the sector 19 can include a linkage and/or a system of gears. Furthermore, and as already explained in connection with FIG. 1, the sector 19 or an analogous part which moves in response to movements of the disk 7 can be designed to act directly upon the latch 17 so as to disengage this latch from the ratcht wheel 6a provided that the knob 15 is moved to its operative position at a time when the major part of motion picture film is already collected by the takeup reel 6.

Still further, the camera of FIG. 1 or 2 can be provided with a semiautomatic fading mechanism which insures that the exposures of film with fade-out effect are made automatically in response to placing of the knob 15 to its operative position but the film must be transported rearwardly by hand so as to permit repeated exposure (with fade-in effect) of those frames which were exposed with fade-out effect. The fading mechanism may include discrete knobs or similar actuating members which are to be moved in order to start the making of exposures with fade-out effect, to start rewinding of film subsequent to completion of exposures with fade-out effect, and to start the making of exposures with fade-in effect. Also, the fading mechanism can be of the adjustable type so that it can be operated in a fully automatic way or semiautomatically. All such modifications will be readily comprehended upon perusal of the description of FIGS. 1 and 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a motion picture camera, the combination of film transporting means operable to transport motion picture film lengthwise; rotary takeup means normally receiving motion from said transporting means to collect the film when the film is transported forwardly; frame counter means operatively connected with said transporting means and movable between a plurality of positions each of which is indicative of a different number of unexposed film frames; fading means activatable to arrest said takeup means while said transporting means is in operation so as to prevent collection of a length of forwardly transported film by said takeup means; and blocking means arranged to deactivate said fading means in at least one predetermined position of said counter means.

2. The combination as defined in claim 1, wherein said blocking means is arranged to deactivate said fading means in that position of said counter means which is indicative of a predetermined minimum number of unexposed film frames.

3. The combination as defined in claim 1, wherein said fading means includes switch means and actuating means for closing said switch means to thereby activate said fading means, said blocking means comprising a device which prevents closing of said switch means in said predetermined postion of said counter means.

4. The combination as defined in claim 3, wherein said switch means comprises a pair of contacts and said actuating means comprises means for moving one of said contacts into an operative position of engagement with the other contact, said device comprising means for disengaging said other contact from said one contact in the operative position of said one contact.

5. The combination as defined in claim 1, wherein said fading means comprises an arresting member which is movable to and from an operative position in which said arresting member prevents rotation of said takeup means, said blocking means comprising a device for effecting movement of said arresting member from said operative position in response to movement of said counter means to said predetermined position.

6. The combination as defined in claim 5, wherein said fading means further comprises an actuating member movable by hand to thereby move said arresting member to said operative position.

7. The combination as defined in claim 6, wherein said device is arranged to move said arresting member from said operative position by way of said actuating member.

8. The combination as defined in claim 5, wherein said arresting member is in direct engagement with a portion of said takeup means in the operative position thereof.

9. The combination as defined in claim 1, wherein said frame counter means comprises a rotary member and said blocking means comprises a device which is provided on and rotates with said rotary member.

10. The combination as defined in claim 9, wherein said device is a sector provided on said rotary member and having a surface which is movable into engagement with a portion of said fading means to thereby deactivate said fading means in response to movement of said rotary member to said predetermined position.

11. The combination as defined in claim 1, wherein said fading means comprises an actuating member movable to and from an operative position and further comprising means for indicating the operative position of said actuating member.

12. The combination as defined in claim 11, wherein said blocking means is arranged to move said actuating member from said operative position in response to movement of said counter means to said predetermined position.

References Cited
UNITED STATES PATENTS

| | | | |
|---|---|---|---|
| 3,246,944 | 4/1966 | Winkler | 352—174 X |
| 3,384,437 | 5/1968 | Winkler et al. | 352—173 X |
| 3,425,776 | 2/1969 | Mayr et al. | 352—91 X |
| 3,514,197 | 5/1970 | Sho | 352—91 |
| 3,582,198 | 6/1971 | Reinsch | 352—91 |

SAMUEL S. MATTHEWS, Primary Examiner

R. P. GREINER, Assistant Examiner

U.S. Cl. X.R.

352—173, 174, 217